H. FELDMEIER.
HOLDING TANK FOR PASTEURIZERS.
APPLICATION FILED AUG. 18, 1917.
1,319,057.
Patented Oct. 21, 1919.
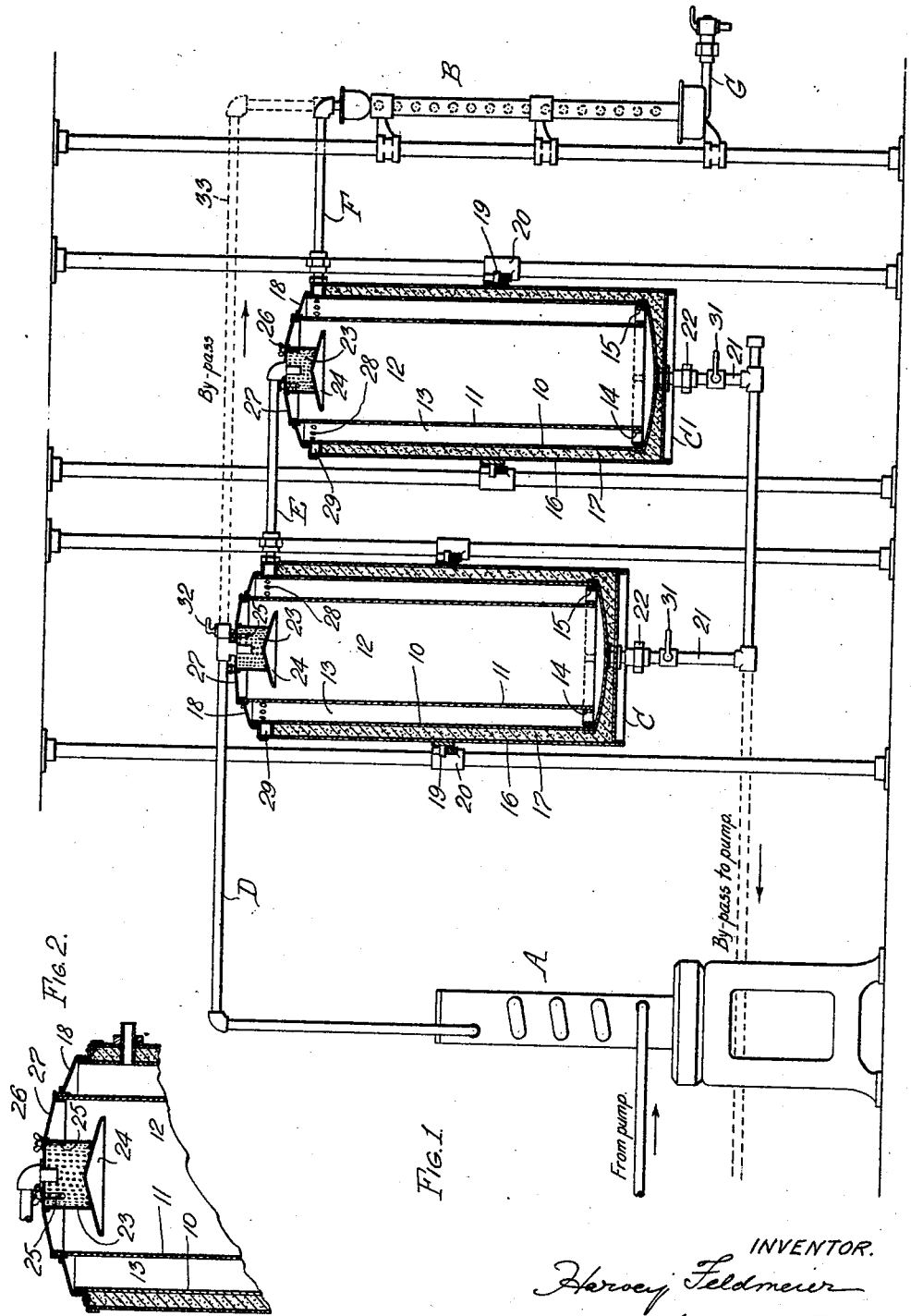
INVENTOR.
Harvey Feldmeier
By Wilhelm & Parker.
ATTORNEYS.

UNITED STATES PATENT OFFICE.

HARVEY FELDMEIER, OF LITTLE FALLS, NEW YORK, ASSIGNOR TO D. H. BURRELL & CO., OF LITTLE FALLS, NEW YORK.

HOLDING-TANK FOR PASTEURIZERS.

1,319,057.  Specification of Letters Patent.  Patented Oct. 21, 1919.

Application filed August 18, 1917. Serial No. 186,940.

*To all whom it may concern:*

Be it known that I, HARVEY FELDMEIER, a citizen of the United States, residing at Little Falls, in the county of Herkimer and State of New York, have invented a new and useful Improvement in Holding-Tanks for Pasteurizers, of which the following is a specification.

This invention relates to pasteurizing apparatus and more particularly to improvements in holding tanks of the vertical cylindrical type now in use which are arranged so that the milk or other liquid being pasteurized flows continuously through them on it way from the heater to the cooler, and which are for the purpose of holding the milk or liquid for the reqired length of time at the pasteurizing temperature.

The theory of operation of these tanks is that the milk will flow progressively and uniformly through the tanks and arrange itself in layers according to temperature. As a matter of fact, in the tanks heretofore constructed, there is considerable diffusion and short circuiting, due to the formation of eddies and other currents, caused partly by the incoming milk and by fluctuations in temperature, the colder particles tending to sink faster.

The objects of this invention are to increase the efficiency of holding tanks of this type by constructing them so as to insure a steady progressive and uniform flow of the liquid through the tank with the minimum disturbance, diffusion and short circuiting; to greatly increase the length of the flow space in the tank and obtain the advantage of a deep tank without making the tank of objectional depth or dimensions; and also to improve the construction of holding tanks in the other respects hereinafter described and set forth in the claims.

In the accompanying drawings:—

Figure 1 is an elevation, partly in section, of a pasteurizing apparatus provided with holding tanks embodying the invention.

Fig. 2 is a fragmentary sectional elevation on an enlarged scale of one of the holding tanks, showing a slightly modified construction.

A represents the liquid heater and B the liquid cooler of a pasteurizing apparatus, and C, C' represent holding tanks which are arranged so that the liquid passes through them in succession on its way from the heater to the cooler and in which the liquid is held at the pasteurizing temperature for the required length of time. The liquid is delivered from the heater by a pipe D to the first holding tank C. It first fills this tank and overflows from the same through a pipe E into the next holding tank C', and after filling that tank, overflows from the same through a pipe F into the cooler B from which it is discharged through a pipe G. The heater and cooler may be of any usual or suitable type, and any desired number, one or more, of the holding tanks may be used, depending upon the capacity of the apparatus.

Each of the holding tanks, which are alike, comprises an upright, preferably cylindrical tank or receptacle 10 and an upright partition, preferably in the form of on open-ended tube or cylinder 11, which is supported within the tank and divides the tank into two compartments or spaces 12 and 13 of substantially equal volume inside and outside of the partition which communicate at the lower end of the partition. As shown a ring 14 is secured to the lower end of the partition 11 and is connected by spokes or arms to a larger concentric ring 15 which is of slightly smaller diameter than the tank 10 and rests on the bottom of the tank near its periphery. This ring supports the partition 11 in the tank, leaving a flow space under the lower end of the partition, and it also acts as a guide for the partition when taking it out and replacing it in the tank. While this means for supporting the partition is preferred, it could be supported in the tank in any other suitable way. The tank 10 is suitably insulated to retain the heat, for which purpose it is shown as provided with an outer jacket 16 and an insulating filling 17 of suitable material between the jacket and the wall of the vessel 10. 18 is an annular removable cover for the upper end of the outer compartment of the tank.

For convenience in removing and inserting the partition and cleaning the tank, the tank is preferably pivotally mounted, as by trunnions 19 seated in supporting bearings 20. The usual drain or bypass pipe 21 is shown connected by a coupling 22 to a nipple at the bottom of the tank. The coupling 22 permits the tank to be disconnected from the bypass pipe when it is desired to tilt the tank.

In order to produce as little disturbance as possible to the milk or liquid, a distributer is provided to distribute the liquid evenly and gently at the surface of the liquid in the top of the tank. The distributer shown consists of a vessel 23 having perforated side walls and a conical or flaring bottom or skirt 24. The milk is discharged into the distributer, flows through the perforations thereof and downwardly over the outwardly extending flaring skirt. The distributer is shown as being supported by bolts 25 secured to the distributer and engaging wing nuts 26 resting on a cover 27 for the upper end of the partition or inner compartment of the tank. The distributer could be of different suitable construction and differently supported if desired. In discharging the milk from the tank it is desirable to have it flow uniformly from all sides of the tank. For this purpose, the upper end of the wall of the receptacle 10 in the construction shown in Fig. 1 is perforated throughout its circumference at 28 and is surrounded by an annular trough or channel 29 into which the milk overflows through the perforations and from which it discharges through the pipe E, or the pipe F.

In the use of the apparatus the milk or liquid flows from the heater A through the pipe D and the distributer 23 into the first holding tank C. It first fills this tank which overflows into the second tank C' through the pipe E and fills that tank, and then overflows through the pipe F to the cooler G. After the tanks are filled, the milk or liquid flows continuously through the tanks from the heater to the cooler. The milk or liquid travels down through the inner compartment or space 12 and up through the outer compartment or space 13 of each tank, thus traveling approximately twice as far in each tank as in a tank of substantially like dimensions of the single or plain cylindrical type heretofore used. Since the inner and outer spaces 12 and 13 are of substantially equal volume, the milk or liquid travels at a uniform speed through both spaces, whereas in the old construction the milk travels only downwardly in the tank.

The efficiency of holding tanks of the plain single cylinder type heretofore used has been found approximately proportionate to their depth, because the efficiency is proportional to the speed or rate of flow, and this in turn is proportionate to the depth of the tank. The construction described is equivalent to doubling the depth of the tank, and therefore doubling the speed or rate of flow of the milk through the tank and since it is inconvenient to have tanks of great depth, the described construction makes available the advantage of a deep tank within convenient dimension. The new construction forms a sort of trap for the colder particles of the liquid because such particles, when they reach the bottom of the tank and start to rise in the outer compartment tend to lag, on account of their greater weight, and are subject therefore to the holding process longer in the tank described than in the old construction.

The tanks C and C' can be emptied at the end of a run of milk or liquid by opening the cocks 31 of the bypass pipe 21 and a cock 32 thus permitting the pump (not shown) to draw the liquid from the bottom of the tanks and deliver it directly to the cooler through a bypass pipe 33, shown by broken lines, leading from the tank feed pipe D to the cooler B.

I claim as my invention:—

1. A holding tank for liquid pasteurizers comprising an upright insulated receptacle, an upright partition in said receptacle dividing the same into upright receiving and discharge compartments of substantially equal volume which communicate at their lower ends, a distributing device in the upper end of said receiving compartment, means for delivering the liquid to said distributing device, and means for the discharge of the liquid from the upper end of said discharge compartment.

2. A holding tank for liquid pasteurizers comprising an upright insulated receptacle, an upright tubular partition dividing said receptacle into inner and outer compartments of substantially equal volume which communicate at the lower end of said receptacle, means for delivering liquid into the upper end of one of said compartments, and means for the discharge of the liquid from the upper end of the other compartment.

3. A holding tank for liquid pasteurizers comprising an upright insulated tank, an upright partition arranged substantially cencentrically in said tank and dividing the same into receiving and discharge compartments of substantially equal volume which communicate at their lower ends, a distributing device in the upper end of the receiving compartment, means for delivering the liquid to said distributing device, and means for the discharge of the liquid from the upper end of the discharge compartment.

4. A holding tank for liquid pasteurizers comprising an upright insulated tank, an upright partition in said tank dividing the same into inner and outer receiving and discharge compartments of substantially equal volume which communicate at their lower ends, a distributing device in the upper end of said inner receiving compartment, means for delivering the liquid to said distributing device, and means for the discharge of the liquid from the upper end of said outer discharge compartment.

5. A holding apparatus for liquid pasteurizers comprising a plurality of upright insulated tanks, an upright partition arranged in each tank and dividing the same into receiving and discharge compartments of substantially equal volume which communicate at their lower ends, a distributing device in the upper end of each receiving compartment, means for delivering the liquid to the distributing device in one tank, and means for delivering the liquid from the upper end of the discharge compartment of each tank to the distributing device of the next tank.

6. A holding tank for pasteurizing apparatus comprising an upright receptacle, an upright tubular partition dividing said receptacle into inner and outer compartments of substantially equal volume which communicate at the lower end of said receptacle, a liquid distributing device in the upper end of said inner compartment, means for delivering the liquid to said distributing device, and a discharge trough surrounding the upper end of said receptacle into which the liquid overflows from the sides of said outer compartment and from which the liquid discharges.

Witness my hand this 15 day of August, 1917.

HARVEY FELDMEIER.

Witnesses:
J. E. MERCHANT,
W. T. WOLFENDEN.